(12) United States Patent
Kuroki et al.

(10) Patent No.: US 7,440,200 B2
(45) Date of Patent: Oct. 21, 2008

(54) PROJECTION TYPE DISPLAY APPARATUS HAVING MICRO MIRROR TYPE DISPLAY ELEMENT

(75) Inventors: Futoshi Kuroki, Nagano (JP); Toshimitsu Iwai, Tokyo (JP); Hiroshi Kida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 16 days.

(21) Appl. No.: 11/636,551

(22) Filed: Dec. 11, 2006

(65) Prior Publication Data

US 2007/0132961 A1    Jun. 14, 2007

(51) Int. Cl.
*G02B 7/02* (2006.01)

(52) U.S. Cl. ...................................... 359/819; 359/811
(58) Field of Classification Search ................ 359/811, 359/813, 814, 818, 819, 821, 822, 825, 827
See application file for complete search history.

(56) References Cited

U.S. PATENT DOCUMENTS 6,715,889 B2 *    4/2004   Nishima et al.

FOREIGN PATENT DOCUMENTS

JP            2005-128370 A       5/2005

* cited by examiner

*Primary Examiner*—Timothy J Thompson
(74) *Attorney, Agent, or Firm*—Birch, Stewart, Kolasch & Birch, LLP (57) ABSTRACT

A projection type display apparatus includes a projection lens barrel holding a projection lens, a micro mirror type display element, and a main body which holds the micro mirror type display element and on which the projection lens barrel is mounted. The projection lens barrel is formed with a barrel-side reference surface which becomes a mounting reference in a direction of an optical axis, and the main body is formed with a mounting reference surface against which the barrel-side reference surface abuts. The main body has an adjusting mechanism which adjusts a length between a reflection surface of the micro mirror type display element and the mounting reference surface.

6 Claims, 6 Drawing Sheets

PROJECTION TYPE DISPLAY APPARATUS HAVING MICRO MIRROR TYPE DISPLAY ELEMENT

BACKGROUND OF THE INVENTION

1. Field of the Invention

The present invention relates to a projection type display apparatus having a micro mirror type display element.

In this specification, the term "micro mirror type display element" means an optical modulator in which a large number of square micro mirrors each having some μm side are arranged on a silicon substrate, inclination of the micro mirrors is changed utilizing electrostatic attraction, thereby controlling whether light from a light source should be reflected in a direction of a screen. This micro mirror type reflection element generally has the same function as that of an element called DMD that is a trade name of Texas Instruments Incorporated.

2. Description of the Background Art

Conventionally, as a projector for projecting a predetermined image on a screen under magnification through a projection lens, there is a known projection type display apparatus having a micro mirror type display element which is a reflection type optical modulator (see Japanese Patent Application Laid-open No. 2005-128370 for example). The projection type display apparatus described in Japanese Patent Application Laid-open No. 2005-128370 includes a projection lens barrel which holds a projection lens, and a main body to which an illumination optical system such as various lenses and mirrors, and a micro mirror type display element are fixed, and on which the projection lens barrel is mounted.

Generally, in the projection type display apparatus having the micro mirror type display element, a flange focal length is adjusted to prevent a resolution of a picture to be projected on a screen from being deteriorated. The flange focal length is a length between a reference surface of a projection lens barrel that is a mounting reference on a main body in a direction of an optical axis and a reflection surface of the micro mirror type display element. As an adjusting method of the flange focal length, Japanese Patent Application Laid-open No. 2005-128370 (see paragraphs 0038, 0039 and FIG. 3) proposes a method in which a spacer is disposed between the reference surface of the projection lens barrel and the main body. According to this adjusting method of the flange focal length, when the projection type display apparatus is assembled, the flange focal length is adjusted in each projection type display apparatus.

In a projection type display apparatus having a conventional micro mirror type display element, a projection lens having a predetermined focal length is held by the projection lens barrel as a standard lens, and if this projection lens barrel is mounted on a main body when the projection type display apparatus is assembled, the projection lens barrel is not interchanged thereafter unless special requirement such as damage of the projection lens comes about. That is, in the projection type display apparatus having the conventional micro mirror type display element, an option lens such as a wide converter which is a lens for reducing a focal length to widen an angle of view and a tele converter which is a lens to increase the focal length to obtain a telephotography effect is not used. Therefore, in a general projection type display apparatus having the micro mirror type display element, the projection lens barrel is not interchanged.

On the other hand, in recent years, projection type display apparatuses with which option lenses can be used for making it possible to change a projection length from the projection type display apparatus having the micro mirror type display element to the screen to enhance the ease of use of the projection type display apparatus are required in the market. To meet the requirement, for the projection type display apparatus having the micro mirror type display element, there is required a structure which makes it possible to interchange between a projection lens barrel whose flange focal length is adjusted when a standard projection lens is held and assembled and an option projection lens barrel.

When a projection lens barrel is interchanged in the projection type display apparatus having the micro mirror type display element to make it possible to use an option lens, however, there is a problem that a sufficient resolution of a picture projected on a screen can not be obtained due to variation on the side of the projection lens barrel caused by a precision error of parts of the option lens and the projection lens barrel itself or a mounting error of the option lens on the projection lens barrel, and variation on the side of the main body caused by a precision error of parts of the micro mirror type display element and the main body itself and a mounting error of the micro mirror type display element on the main body. Japanese Patent Application Laid-open No. 2005-128370 does not propose concrete means for solving such a problem caused when the projection lens barrel is interchanged.

SUMMARY OF THE INVENTION

In a projection type display apparatus having a micro mirror type display element, it is an object of the present invention to provide a structure capable of suppressing deterioration of a resolution of a picture to be projected on a screen even when a projection lens barrel is interchanged.

A projection type display apparatus of the present invention includes a projection lens barrel holding a projection lens, a micro mirror type display element, and a main body which holds the micro mirror type display element and on which the projection lens barrel is mounted. The projection lens barrel is formed with a barrel-side reference surface which becomes a mounting reference in a direction of an optical axis. The main body is formed with a mounting reference surface against which the barrel-side reference surface abuts. The main body has an adjusting mechanism which adjusts a length between a reflection surface of the micro mirror type display element and the mounting reference surface.

Since the main body includes the adjusting mechanism which adjusts the length between the mounting reference surface which abuts against the barrel side reference surface and the reflection surface of the micro mirror type display element, it is possible to adjust the length between the mounting reference surface and the reflection surface of the micro mirror type display element to a substantially constant value. That is, it is possible to adjust the length between the mounting reference surface and the reflection surface of the micro mirror type display element to a design approximation by the adjusting mechanism, and to prevent a variation on the side of the main body. Therefore, even when the projection lens barrel is replaced by another one, an influence of the variation on the side of the main body on a resolution of a picture to be projected on a screen can be eliminated. As a result, it is possible to suppress deterioration of the resolution of the picture to be projected on the screen.

The length between the mounting reference surface and the reflection surface of the micro mirror type display element can be adjusted to a design approximation by the adjusting mechanism. Therefore, if a reference main body in which the length between the mounting reference surface and the reflection surface of the micro mirror type display element is adjusted to the design approximation is prepared and the projection lens barrel holding an option lens is produced using this reference main body, it is also possible to suppress the variation on the side of the projection lens barrel. As a result, it is possible to suppress the deterioration of a resolution of a picture to be projected on the screen more effectively.

These and other objects, features, aspects and advantages of the present invention will become more apparent from the following detailed description of the present invention when taken in conjunction with the accompanying drawings.

DESCRIPTION OF THE PREFERRED EMBODIMENTS

The best mode for carrying out the invention will be explained below in reference to the drawings.

(Outline Structure of a Projection Type Display Apparatus)

Figure 1:
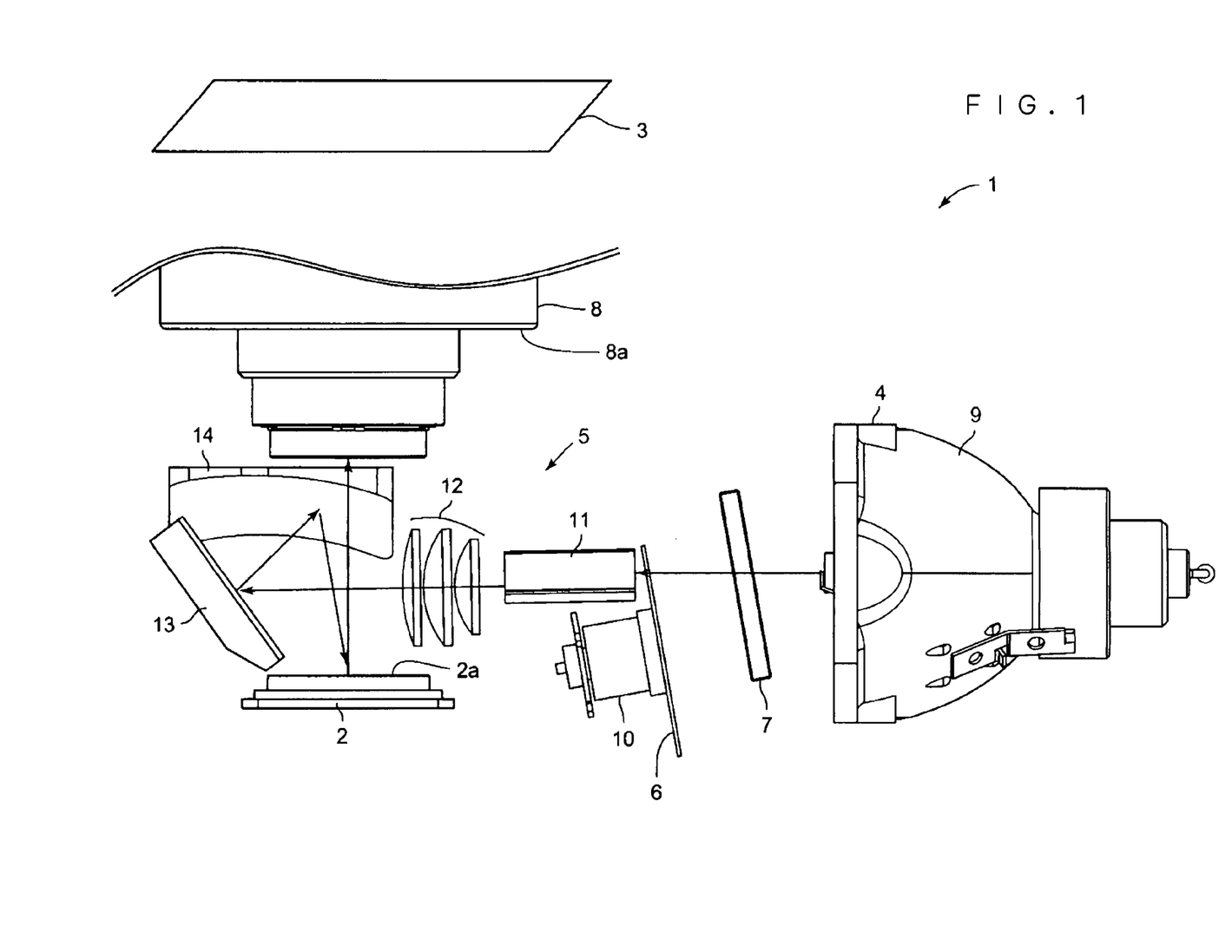
FIG. 1 is a schematic diagram showing a structure of an outline structure of a projection type display apparatus according to an embodiment of the present invention.
Figure 2:
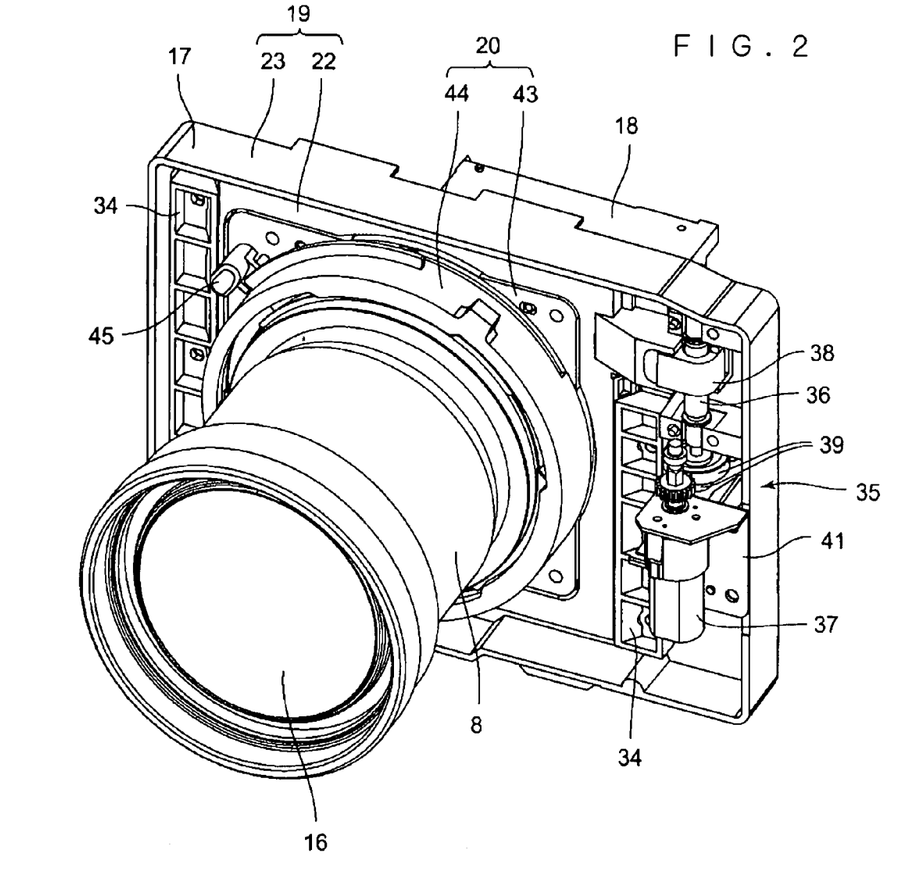
FIG. 2 is a perspective view showing a state in which a projection lens barrel is mounted on a main body which holds a micro mirror type display element shown in FIG. 1.

FIG. 1 is a schematic diagram showing a structure of an outline structure of a projection type display apparatus 1 according to an embodiment of the present invention. FIG. 2 is a perspective view showing a state in which a projection lens barrel 8 is mounted on a main body 17 which holds a micro mirror type display element 2 shown in FIG. 1.

The projection type display apparatus 1 of the embodiment is a display apparatus which projects a predetermined picture on a screen 3 under magnification utilizing a micro mirror type display element 2 which is a reflection type optical modulator. As shown in FIG. 1, the projection type display apparatus 1 includes the micro mirror type display element 2, a lamp 4 as a light source, an illumination optical system 5, a color wheel (CW) 6, an explosion-proof glass 7, a projection lens barrel 8, and a casing (not shown) in which these members are accommodated.

The lamp 4 includes a bright spot (not shown) such as a filament and a discharging portion, and an elliptic reflector 9. The lamp 4 is a super-high pressure mercury lamp for example. As shown in FIG. 1, the lamp 4 emits white illumination light to the illumination optical system 5.

The CW 6 is formed into a thin disk-like shape, and is disposed between the lamp 4 and the illumination optical system 5. As shown in FIG. 1, the CW 6 is fixed to an output shaft of a motor 10, and is rotated by the motor 10. The CW 6 of the embodiment includes three filter portions, i.e., a red filter portion (not shown), a blue filter portion (not shown) and a green filter portion (not shown). Each of the three filter portions is formed into the shape of a sector, and the three sectors are arranged around the rotation center of the CW 6. If the CW 6 rotates by the motor 10, the three filter portions, in order, cut across an optical path connecting the lamp 4 and the illumination optical system 5 with each other, and illumination light emitted from the lamp 4 passes through the filter portions of the CW 6.

The explosion-proof glass 7 is disposed between the lamp 4 and the CW 6 to prevent glass from shattering when the lamp 4 comprising the super-high pressure mercury lamp is destroyed, and to prevent the CW 6 from being damaged.

As shown in FIG. 1, the illumination optical system 5 of the embodiment includes a rod integrator 11, a relay lens unit 12, a plane mirror 13, and a concave mirror 14. As shown in FIG. 1, illumination light which is emitted from the lamp 4 and passed through the CW 6 enters the micro mirror type display element 2 through the rod integrator 11, the relay lens unit 12, the plane mirror 13 and the concave mirror 14 in this order. That is, the illumination light which passed through the CW 6 becomes illumination light having uniform illumination distribution at the rod integrator 11 and passes through the relay lens unit 12. The illumination light which passed through the relay lens unit 12 is reflected by the plane mirror 13 toward the concave mirror 14 and then, is reflected by the concave mirror 14 toward the micro mirror type display element 2, and enters the micro mirror type display element 2. As shown in FIG. 1, the relay lens unit 12 of the embodiment includes three relay lenses for example.

The micro mirror type display element 2 includes a plurality of reflectors (not shown) which form a reflection surface (upper surface in FIG. 1) 2a. The reflection surface 2a modulates incident illumination light and reflects the same toward the projection lens barrel 8. The micro mirror type display element 2 also includes a control circuit (not shown) for driving and controlling the reflector. In the micro mirror type display element 2, inclinations of the plurality of reflectors are controlled based on a drive signal from the control circuit. More specifically, the reflector to which an "ON" drive signal is given from the control circuit inclines such that the incident illumination light is reflected toward the projection lens barrel 8, and a reflector to which an "OFF" drive signal is given from the control circuit inclines such that the incident illumination light is reflected to a position separated away from the projection lens barrel 8. In this way, the micro mirror type display element 2 modulates the incident illumination light and reflects the same toward the projection lens barrel 8. The reflection surface 2a of the micro mirror type display element 2 is formed with a predetermined picture.

As shown in FIG. 2, the projection lens barrel 8 holds a lens 16. The projection lens barrel 8 also holds a lens (not shown) in addition to the lens 16. That is, the projection lens barrel 8 holds projection lenses including the lens 16. As shown in FIG. 2, the projection lens barrel 8 is detachably attached to the main body 17. As shown in FIG. 1, the projection lens barrel 8 is formed with a barrel-side reference surface 8a in the direction of the optical axis of the projection lens barrel 8 (vertical direction in FIG. 1) which serves as a mounting reference on the main body 17. A positioning recess (not shown) used for positioning when mounted on the main body 17 is formed in the barrel-side reference surface 8a. A flange 8b to be fixed to the main body 17 projects from the projection lens barrel 8 radially outward (see FIG. 3).

The projection lens held by the projection lens barrel 8 brings the screen 3 and the reflection surface 2a of the micro mirror type display element 2 into an optically conjugate relation. That is, a picture formed on the reflection surface 2a of the micro mirror type display element 2 is projected on the screen 3 by the projection lens under magnification.

The projection type display apparatus 1 of the embodiment uses a projection lens barrel 8 holding a projection lens having a predetermined focal length as a standard lens, and a projection lens barrel 8 holding an option lens such as a wide converter and a tele converter. That is, according to the projection type display apparatus 1 of the embodiment, various projection lens barrels 8 holding various projection lenses can be detachably attached to the main body 17, and it is possible to use the option lens. Therefore, according to the projection type display apparatus 1, the projection length from the reflection surface 2a of the micro mirror type display element 2 to the screen 3 can be changed.

The micro mirror type display element 2 and the illumination optical system 5 are held by the main body 17. More specifically, the micro mirror type display element 2 and the illumination optical system 5 are held by the main body 17 at a backward side of the paper sheet of FIG. 2. That is, the micro mirror type display element 2 and the illumination optical system 5 are held by the main body 17 at a position opposite from a side where the projection lens barrel 8 of the main body 17 is mounted. Detailed structure of the main body 17 will be described below.

(Structure of Main Body)

Figure 3:
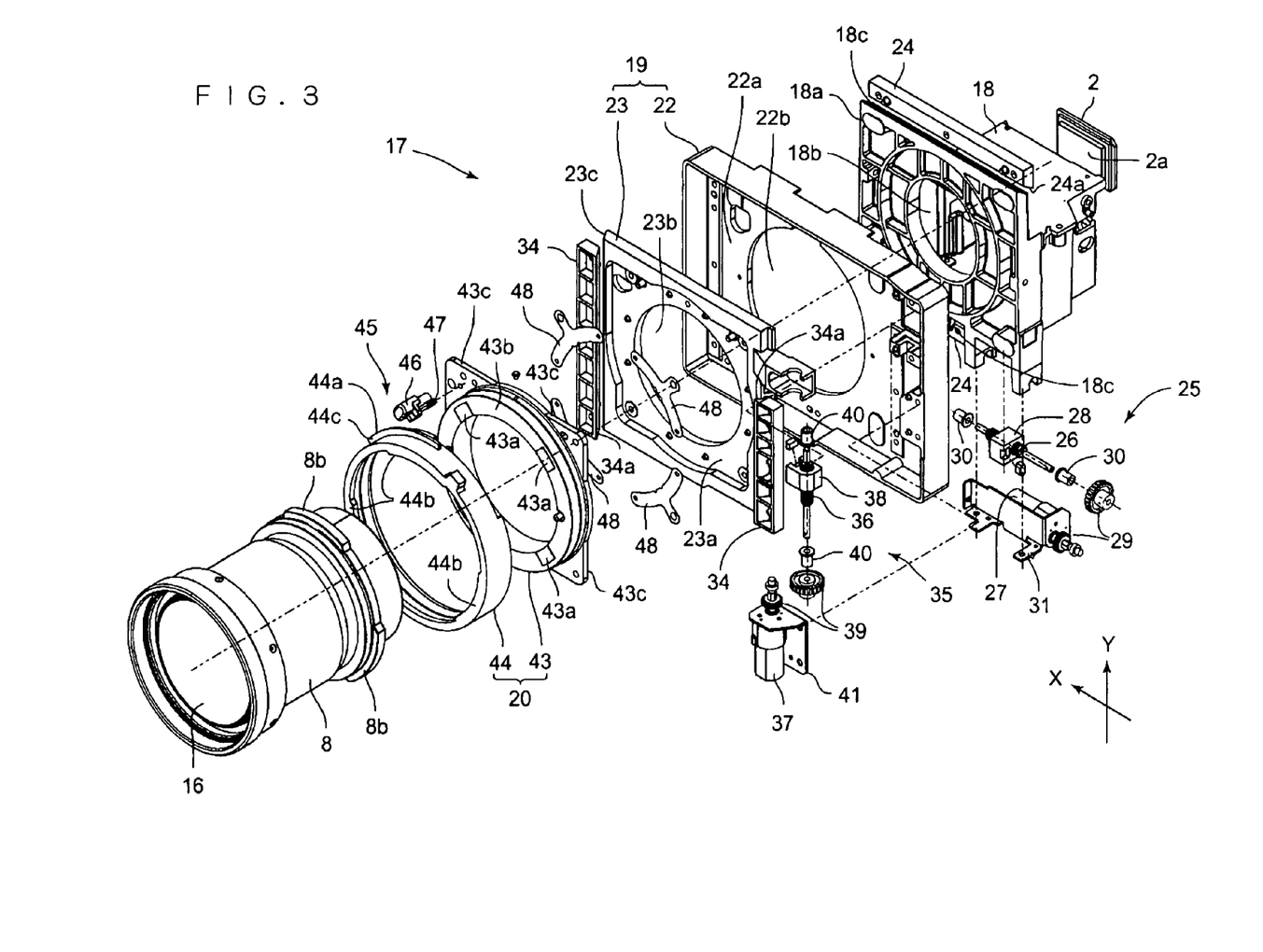
FIG. 3 is an exploded perspective view of the main body shown in FIG. 2.
Figure 4:
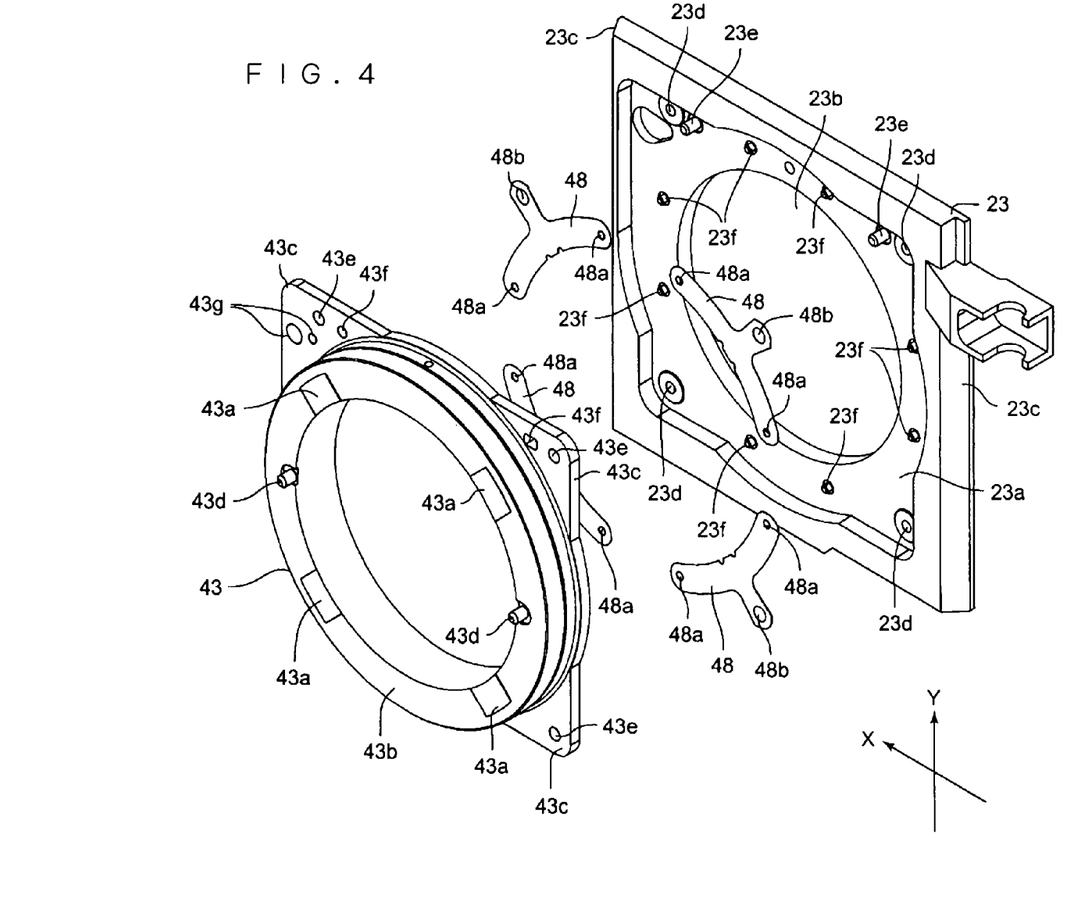
FIG. 4 is an exploded perspective view of a mount flange, a spacer and a second moving body shown in FIG. 3.
Figure 5:
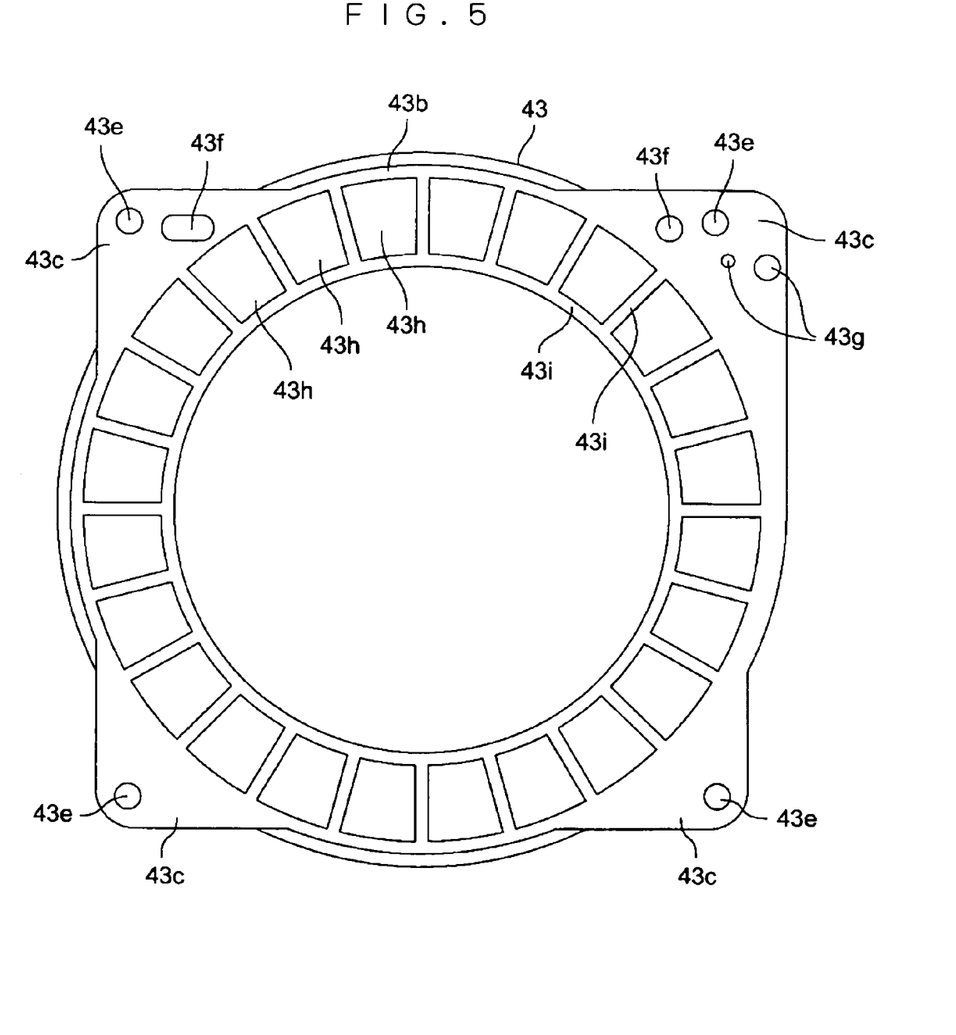
FIG. 5 is a back view showing a back of the mount flange shown in FIG. 3.

FIG. 3 is an exploded perspective view of the main body 17 shown in FIG. 2. FIG. 4 is an exploded perspective view of a mount flange 43, a spacer 48 and a second moving body 23 shown in FIG. 3. FIG. 5 is a back view showing a back of the mount flange 43 shown in FIG. 3.

As shown in FIG. 3, the main body 17 includes a display element fixing member 18 to which the illumination optical system 5 (not shown in FIG. 3) and the micro mirror type display element 2 are fixed, a moving portion 19 which can move relative to the display element fixing member 18 in a direction perpendicular to the direction of the optical axis of the projection lens barrel 8, and a barrel fixing portion 20 on which the projection lens barrel 8 is fixed. In the following description, a direction which is orthogonal to the direction of the optical axis of the projection lens barrel 8 and which is the vertical direction in FIG. 3 is described as Y direction, a direction which is orthogonal to the direction of the optical axis of the projection lens barrel 8 and to the Y direction is described as X direction. A direction of the optical axis of the projection lens barrel 8 and on the frontward side of the paper sheet of FIG. 3 is described as a frontward side, and a direction of the optical axis of the projection lens barrel 8 and on the backward side of the paper sheet of FIG. 3 is described as a backward side.

The display element fixing member 18 is formed into a hollow box shape made of metal such as aluminum. As shown in FIG. 3, a mounting portion 18a on which the moving portion 19 is mounted is formed on the display element fixing member 18 on the side of the projection lens barrel 8 (frontward side). A circular opening 18b is formed at a center of the mounting portion 18a such as to penetrate the display element fixing member 18. Inclined surfaces 18c and 18c are formed on both ends (upper and lower ends) of the mounting portion 18a in the Y direction. The inclined surfaces 18c and 18c incline inward in the Y direction as moving the backward side.

In the embodiment, the micro mirror type display element 2 is fixed to the backward side surface of the display element fixing member 18. The rod integrator 11 and the relay lens unit 12 are fixed to a left surface of the display element fixing member 18 in FIG. 3. Illumination light of the lamp 4 enters the display element fixing member 18 from the left side in FIG. 3. The illumination light which enters the display element fixing member 18 enters the micro mirror type display element 2 through the illumination optical system 5 and is modulated, and the modulated light passes through the opening 18b toward the projection lens barrel 8.

The moving portion 19 includes a first moving body 22 which can move in the X direction, and a second moving body 23 which can move in the Y direction. The second moving body 23 can move in the Y direction relative to the first moving body 22, and the first moving body 22 can move in the X direction together with the second moving body 23 relative to the display element fixing member 18.

The first moving body 22 is made of metal such as aluminum. As shown in FIG. 3, the first moving body 22 is formed into a substantially rectangular parallelepiped box shape whose frontward side is opened, and its backward side is an abutting portion 22a which abuts against the mounting portion 18a. The abutting portion 22a is formed with an opening 22b through which light reflected by the micro mirror type display element 2 passes toward the projection lens barrel 8.

The first moving body 22 of the embodiment is mounted on the display element fixing member 18 by means of two guide members 24 and 24 which are made of resin members having excellent sliding properties and are disposed in parallel to each other in the Y direction such that the first moving body 22 can move in the X direction relative to the display element fixing member 18. The first moving body 22 is formed so that it is driven by an X direction drive means 25, and moves in the X direction relative to the display element fixing member 18.

As shown in FIG. 3, each of the guide members 24 and 24 is formed with an inclined surface 24a (illustration of another inclined surface 24a of the guide member 24 illustrated on the lower side in FIG. 3 is omitted) which abuts against the inclined surface 18c of the display element fixing member 18. Each of the guide members 24 and 24 is fixed to an abutting portion 22a in a state where the inclined surface 24a and the inclined surface 18c are in abutment against each other and the mounting portion 18a and the abutting portion 22a are in abutment against each other. When the first moving body 22 is driven by the X direction drive means 25, the inclined surface 24a slides on the inclined surface 18c, thereby guiding the first moving body 22 in the X direction.

As shown in FIG. 3, the X direction drive means 25 includes a feed screw 26, a motor 27 for rotating the feed screw 26, a connecting nut 28 threadedly engaged with the feed screw 26, and gears 29 and 29 for transmitting power of the motor 27 to the feed screw 26. The feed screw 26 is rotatably held by two bearings 30 and 30 fixed to the display element fixing member 18. The motor 27 is fixed to the display element fixing member 18 through a bracket 31. The connecting nut 28 is mounted on the first moving body 22. The connecting nut 28 which is threadedly engaged with the feed screw 26 rotated by the motor 27 moves in the X direction, the first moving body 22 on which the connecting nut 28 is mounted moves in the X direction with respect to the display element fixing member 18.

The second moving body 23 is formed into a flat and substantially rectangular parallelepiped shape made of metal such as aluminum. A frontward side of the second moving body 23 is formed with a substantially rectangular flange fixing portion 23a. A later-described mount flange 43 constituting the barrel fixing portion 20 is fixed to the flange fixing portion 23a. The flange fixing portion 23a is formed such as to be recessed toward the backward side. The second moving body 23 is formed at its center with a circular opening 23b through which light reflected by the micro mirror type display element 2 passes toward the projection lens barrel 8. As shown in FIG. 4, both ends (left and right ends) of the second moving body 23 in the X direction are formed with inclined surfaces 23c and 23c. The inclined surfaces 23c and 23c are inclined outward in the X direction as approaching the backward side.

As shown in FIG. 4, four screw holes 23d are formed in four corners of the flange fixing portion 23a for fixing the mount flange 43. Two positioning projections 23e are formed in inner sides of the two screw holes 23d formed in upper ends of the flange fixing portion 23a shown in FIG. 4. The positioning projections 23e project toward the frontward side. The positioning projections 23e are used for positioning the mount flange 43. The flange fixing portion 23a is formed with positioning projections 23f for positioning later described spacers 48. The positioning projections 23f forwardly projects toward the projection lens barrel 8. The positioning projections 23f are formed along a peripheral edge of the opening 23b. In the embodiment, as shown in FIG. 4, the spacers 48 are disposed at four locations, and two positioning projections 23f are formed in each of the four locations. That is, the flange fixing portion 23a is formed with eight positioning projections 23f.

As shown in FIG. 3, the second moving body 23 is mounted by two guide members 34 and 34 made of resin having excellent sliding properties such that the second moving body 23 can move in the Y direction relative to the first moving body 22. The second moving body 23 is driven by a Y direction drive means 35, and moves in the Y direction relative to the first moving body 22.

As shown in FIG. 3, each of the guide members 34 is formed with an inclined surface 34a which abuts against the inclined surface 23c of the second moving body 23. The guide members 34 and 34 are fixed to the abutting portion 22a in a state where the inclined surface 23c and the inclined surface 34a are in abutment against each other and the abutting portion 22a and the second moving body 23 are in abutment against each other. When the second moving body 23 is driven by the Y direction drive means 35, the inclined surface 23c slides with respect to the inclined surface 34a, and the second moving body 23 is guided in the Y direction.

Like the X direction drive means 25, the Y direction drive means 35 includes a feed screw 36, a motor 37 for rotating the feed screw 36, a connecting nut 38 which is threadedly engaged with the feed screw 36, and gears 39 and 39 for transmitting power of the motor 37 to the feed screw 36. The feed screw 36 is rotatably held by two bearings 40 and 40 fixed to the first moving body 22. The motor 37 is fixed to the first moving body 22 through a bracket 41. The connecting nut 38 is mounted on the second moving body 23. If the connecting nut 38 which is threadedly engaged with the feed screw 36 rotated by the motor 37 moves in the Y direction, the second moving body 23 on which the connecting nut 38 is mounted moves in the Y direction with respect to the first moving body 22.

The barrel fixing portion 20 includes a mount flange 43 formed with a mounting reference surface 43a against which the barrel-side reference surface 8a of the projection lens barrel 8 abuts, a mount ring 44 which rotates when the projection lens barrel 8 is attached or detached for fixing the projection lens barrel 8, and a lock member 45 for preventing the mount ring 44 from rotating. In this embodiment, the mount flange 43 is a reference surface forming member formed with the mounting reference surface 43a. The mount flange 43 which is a reference surface forming member is fixed to the second moving body 23 as described above. That is, in the embodiment, the second moving body 23 is a mounting member on which the reference surface forming member is mounted.

The mount flange 43 is a resin molded produce formed by a resin mold. As shown in FIGS. 4 and 5, the mount flange 43 includes a flat and substantially cylindrically shaped cylindrical portion 43b, and substantially triangular four flanges 43c formed such as to spread radially outward from the cylindrical portion 43b on the backward side. A portion of the projection lens barrel 8 is inserted into an inner peripheral side of the cylindrical portion 43b. The mount flange 43 is fixed to the second moving body 23 in a state where the flange 43c abuts against the flange fixing portion 23a of the second moving body 23 through the spacer 48.

The mounting reference surfaces 43a are formed on the frontward side of the cylindrical portion 43b. More specifically, the four substantially rectangular mounting reference surfaces 43a are formed at four locations through about 90° from one another such that the mounting reference surfaces 43a slightly project toward the frontward side. In this embodiment, the barrel-side reference surface 8a directly abuts the mounting reference surfaces 43a. Two positioning projections 43d and 43d are formed on the frontward side of the cylindrical portion 43b for positioning the projection lens barrel 8 together with a positioning recess (not shown) formed in the barrel-side reference surface 8a of the projection lens barrel 8. An outer peripheral surface of the cylindrical portion 43b closer to the frontward side than the flange 43c is formed with a male thread (not shown).

Each of the four flanges 43c is formed with a through hole 43e through which a screw (not shown) to be threadedly engaged with the screw holes 23d is inserted. The two flanges 43c formed on the upper side in FIG. 4 are formed with positioning holes 43f for positioning the mount flange 43 together with the positioning projections 23e. One of the flanges 43c (left flange 43c in FIG. 4) formed with the positioning hole 43f is formed with two insertion holes 43g. Portions of a later-described lock buttons 46 constituting the lock member 45 are inserted into the insertion holes 43g.

As shown in FIG. 5, a back surface (surface on the backward side) of the cylindrical portion 43b is formed with a plurality of thinned portions 43h such that the thinned portions 43h are recessed from back surface. The thinned portions 43h are for preventing a sink of the mount flange 43, and are formed at the time of the resin molding operation. The plurality of thinned portions 43h are formed so that when the mount flange 43 is fixed to the second moving body 23, some of the plurality of thinned portions 43h are disposed at positions opposed to the positioning projections 23f. The thinned portions 43h also serve as releasing portions for avoiding contact (interference) with respect to the positioning projections 23f. Further, frames 43i surrounding the thinned portions 43h and a surface of the flange 43c on the backward side serve as abutment surfaces which abut against the flange fixing portion 23a and the later-described spacer 48.

The mount ring 44 is formed into a flat and substantially cylindrical shape by the resin mold. An inner peripheral side of the mount ring 44 is formed with a female thread (not shown) which is threadedly engaged with a male thread (not shown) of the mount flange 43. As shown in FIG. 3, the mount ring 44 is formed with an outer flange 44a which projects radially outward from a portion of the outer peripheral surface. The outer flange 44a is provided for preventing the mount ring 44 from rotating together with the lock member 45.

As shown in FIG. 3, the mount ring 44 is formed with inner flanges 44b which project radially inward on the frontward side. More specifically, the inner flanges 44b are formed at three locations through a predetermined angle from one another. An inner diameter of the inner flange 44b is smaller than an outer diameter of the flange 8b of the projection lens barrel 8. An inner diameter of a portion between the inner flanges 44b formed at the three locations is greater than the outer diameter of the flange 8b of the projection lens barrel 8. When the projection lens barrel 8 is fixed to the main body 17, the inner flange 44b abuts against the flange 8b of the projection lens barrel 8 and functions to fix the projection lens barrel 8. More specifically, the projection lens barrel 8 is fixed by the inner flange 44b in the following manner.

First, a female thread of the mount ring 44 is lightly threadedly engaged with a male thread of the mount flange 43 fixed to the second moving body 23. In this state, the barrel-side reference surface 8a of the projection lens barrel 8 abuts against the mounting reference surface 43a of the mount flange 43. More specifically, the flange 8b of the projection lens barrel 8 passes between the inner flanges 44b formed at the three locations, and the barrel-side reference surface 8a abuts against the mounting reference surface 43a. If the mount ring 44 is threadedly inserted into the mount flange 43 in this state, the surface of the flange 8b on the frontward side and the surface of the inner flange 44b on the backward side abut against each other, and the projection lens barrel 8 is fixed by the inner flange 44b.

The lock member 45 includes a lock button 46 which abuts against the outer flange 44a and prevents the mount ring 44 from rotating, and a compression coil spring 47 which biases the lock button 46 to the frontward side. In a state where the projection lens barrel 8 is not fixed to the main body 17, the lock button 46 is biased by the compression coil spring 47 and abuts against a surface of the outer flange 44a on the backward side. If the mount ring 44 is screwed into the mount flange 43 and the projection lens barrel 8 is fixed to the main body 17, the lock button 46 comes out from the outer flange 44a and projects toward the frontward side. If the mount ring 44 tries to rotate in a direction in which the screw connection between the mount flange 43 and the mount ring 44 is loosened in this state, the lock button 46 projecting toward the frontward side abuts against a circumferential end 44c (see FIG. 3) of the outer flange 44a to prevent the mount ring 44 from rotating. That is, in this embodiment, the outer flange 44a and the lock member 45 prevent the projection lens barrel 8 which is firmly fixed to the main body 17 from being loosened from the main body 17.

(Structure of Adjusting Mechanism)

Figure 6:
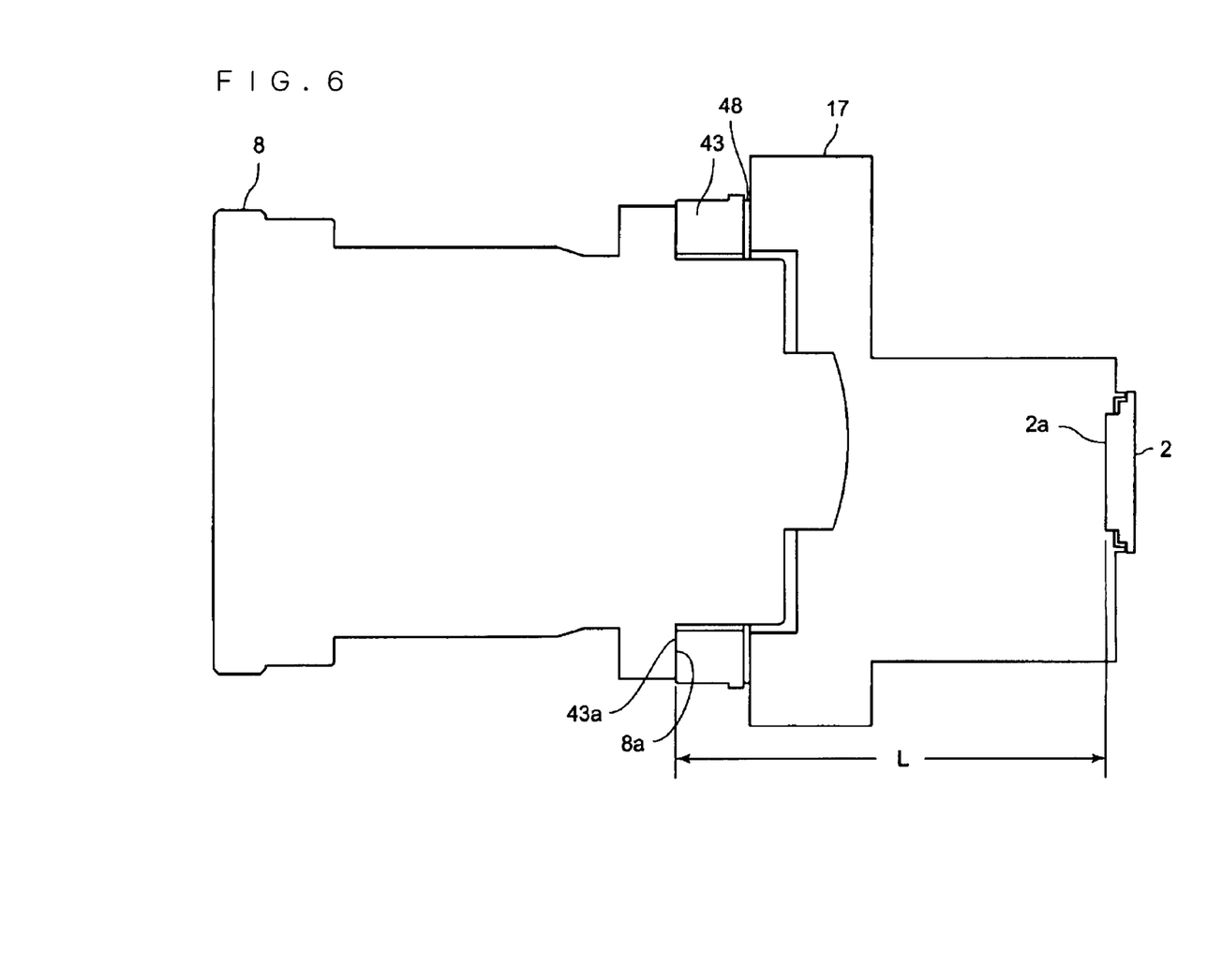
FIG. 6 is a schematic diagram showing a relation between the main body and the projection lens barrel in the direction of the optical axis in the projection type display apparatus shown in FIG. 1.

FIG. 6 is a schematic diagram showing a relation between the main body 17 and the projection lens barrel 8 in the direction of the optical axis in the projection type display apparatus 1 shown in FIG. 1.

In the projection type display apparatus 1, to prevent deterioration of a resolution of a picture to be projected on the screen 3, it is necessary to adjust a flange focal length (see FIG. 6) which is a length between the barrel-side reference surface 8a of the projection lens barrel 8 which is a mounting reference for the main body 17 and the reflection surface 2a of the micro mirror type display element 2. An adjusting mechanism of the flange focal length in the projection type display apparatus 1 will be explained below.

As shown in FIG. 3 and the like, the adjusting mechanism of the flange focal length of the embodiment is the spacers 48 disposed between the second moving body 23 and the mount flange 43 in the direction of the optical axis of the projection lens barrel 8. In this embodiment, the barrel-side reference surface 8a directly abuts against the mounting reference surface 43a of the mount flange 43 as described above. Thus, the length between the barrel-side reference surface 8a and the reflection surface 2a, i.e., the flange focal length is adjusted by adjusting the length L between the mounting reference surface 43a and the reflection surface 2a of the micro mirror type display element 2 by the spacers 48. The spacers 48 constitute a portion of the main body 17.

As shown in FIG. 4 and the like, in the embodiment, the spacers 48 are disposed at the four locations between the second moving body 23 and the mount flange 43. That is, the spacers 48 are disposed at four locations in a plane orthogonal to the direction of the optical axis of the projection lens barrel 8 between the second moving body 23 and the mount flange 43. The length L is adjusted when the main body 17 is assembled such that the length L between the mounting reference surface 43a and the reflection surface 2a of the micro mirror type display element 2 becomes equal to a substantially constant value (concretely, a predetermined design approximation) by the spacers 48.

The spacer 48 is a stainless steel thin plate formed into a substantially T-shape. The thickness of each of the spacers 48 is 0.1 mm for example. By laminating the spacers 48 on one another, it is possible to adjust the length L between the mounting reference surface 43a and the reflection surface 2a in steps of 0.1 mm. In this embodiment, depending upon the precision of various parts constituting the main body 17 and the assembling precision of the main body 17, a plurality of laminated spacers 48 in the direction of the optical axis of the projection lens barrel 8 may be disposed between the second moving body 23 and the mount flange 43, or no spacers 48 may be disposed between the second moving body 23 and the mount flange 43. The number of spacers 48 disposed at the four locations may be different from one another. The length L between the mounting reference surface 43a and the reflection surface 2a of the micro mirror type display element 2 may be adjusted by preparing several kinds of spacers 48 having different thicknesses and by exchanging the spacers 48.

Each of the spacers 48 is formed with two positioning holes 48a into which the two positioning projections 23f are fitted. The spacers 48 are fixed to the second moving body 23 together with the mount flange 43. Each spacer 48 is formed with a through hole 48b into which a screw (not shown) to be threadedly engaged with the screw hole 23d is inserted. When the spacers 48 are formed by presswork, it is preferable that a retuning side of the spacer 48 is disposed toward the mount flange 43 formed with the thinned portion 43h.

(Main Effects of the Embodiment)

As explained above, according to the projection type display apparatus 1 of the embodiment, the main body 17 includes the spacers 48 as the adjusting mechanism which adjusts the length L between the mounting reference surface 43a against which the barrel-side reference surface 8a directly abuts and the reflection surface 2a of the micro mirror type display element 2. Therefore, it is possible to adjust the length L between the mounting reference surface 43a and the reflection surface 2a to a substantially constant length by the spacers 48. That is, it is possible to adjust the length L between the mounting reference surface 43a and the reflection surface 2a to a design approximation by the spacers 48, and to prevent variation of the length L between the mounting reference surface 43a and the reflection surface 2a (variation on the side of the main body 17). Therefore, even when a projection lens barrel 8 holding a standard lens is replaced by a projection lens barrel 8 holding an option lens, influence of variation on the side of the main body 17 on a resolution of a picture to be projected on the screen 3 can be eliminated. As a result, it is possible to suppress the deterioration of the resolution of the picture to be projected on the screen 3.

In the embodiment, it is possible to adjust the length L between the mounting reference surface 43a and the reflection surface 2a to a design approximation by the spacers 48. Therefore, if a reference main body in which the length L between the mounting reference surface 43a and the reflection surface 2a is adjusted to the design approximation is prepared and the projection lens barrel 8 holding an option lens is produced using this reference main body, it is also possible to suppress the variation on the side of the projection lens barrel 8. As a result, it is possible to suppress the deterioration of a resolution of a picture to be projected on the screen 3 more effectively.

In the embodiment, the spacers 48 disposed between the second moving body 23 and the mount flange 43 are used as the adjusting mechanism which adjusts the length L between the mounting reference surface 43a and the reflection surface 2a. Thus, the length L between the mounting reference surface 43a and the reflection surface 2a can be adjusted with a simple structure.

In the embodiment, the spacers 48 are disposed at four locations between the second moving body 23 and the mount flange 43. Thus, if the thicknesses or the number of spacers 48 disposed at the four locations is changed, the inclination of the mount flange 43 with respect to the second moving body 23 in the direction of the optical axis can be adjusted.

The thickness of the spacers 48 disposed between the second moving body 23 and the mount flange 43 may become thinner or the spacers 48 may not be disposed between the second moving body 23 and the mount flange 43 in some cases depending upon the precision of various parts constituting the main body 17 or assembling precision of the main body 17. Therefore, the positioning projections 23f of the second moving body 23 may project toward the mount flange 43 from the abutting surface between the mount flange 43 and the spacer 48 or the abutting surface between the mount flange 43 and the flange fixing portion 23a in some cases. Even if such a case occurs, since the thinned portion 43h is formed at the location opposed to the positioning projections 23f in the mount flange 43 in this embodiment, it is possible to prevent the positioning projections 23f and the mount flange 43 from interfering with each other, and it is possible to reliably bring the abutting surface of the mount flange 43 against the spacer 48 or the abutting surface of the mount flange 43 against the flange fixing portion 23a into abutment. That is, it is possible to prevent the positioning projections 23f and the mount flange 43 from interfering with each other with a simple structure utilizing the thinned portion 43h formed at the time of resin molding.

In this embodiment, the main body 17 includes the moving portion 19 which can move relative to the display element fixing member 18 in a direction perpendicular to the direction of the optical axis of the projection lens barrel 8. That is, the main body 17 includes the first moving body 22 which can move in the X direction, and the second moving body 23 which can move in the Y direction. Therefore, even when the projection type display apparatus 1 is fixed, it is possible to adjust the projection position of a picture on the screen 3. When the main body 17 includes the first moving body 22 and the second moving body 23, since the number of parts of the main body 17 is increased correspondingly, the length L between the mounting reference surface 43a and the reflection surface 2a is prone to be varied, but if the structure of the embodiment is employed, it is possible to prevent the length L from varying.

Other Embodiments

The above embodiment is one example of the preferred mode for carrying out the invention, but the invention is not limited to this embodiment only, and the invention can variously be modified within a range not departing from the subject matter of the invention. For example, in the embodiment, the adjusting mechanism of the flange focal length is the spacers 48 which are disposed between the second moving body 23 and the mount flange 43 in the direction of the optical axis of the projection lens barrel 8. Instead of this, a mechanism for moving the mount flange 43 in a direction of the optical axis of the projection lens barrel 8 with respect to the second moving body 23 using a motor or a feed screw may be employed as the adjusting mechanism of the flange focal length.

In the embodiment, the spacers 48 are disposed between the second moving body 23 and the mount flange 43. Instead of this, the spacers 48 may be disposed between the display element fixing member 18 and the first moving body 22, or between the first moving body 22 and the second moving body 23. That is, the spacers 48 may be disposed at any locations as long as it is between the mounting reference surface 43a and the display element fixing member 18 where the micro mirror type display element 2 is fixed.

In the embodiment, the spacers 48 are disposed at the four locations between the second moving body 23 and the mount flange 43. Instead of this, four spacers 48 may be integrally formed as one spacer and this may be disposed between the second moving body 23 and the mount flange 43. That is, a ring-like spacer may be disposed between the second moving body 23 and the mount flange 43. The spacers may be disposed at two or three locations, or five or more locations. When the spacers are disposed at three or more locations, it is possible to adjust the inclination of the mount flange 43 in the direction of the optical axis with respect to the second moving body 23.

In the embodiment, the moving portion 19 includes the first moving body 22 which can move in the X direction, and the second moving body 23 which can move in the Y direction. Instead of this, the moving portion 19 may move in one of the X direction and Y direction. The moving portion 19 is not always necessary, and the mount flange 43 may directly be fixed to the display element fixing member 18 through the spacers 48.

While the invention has been shown and described in detail, the foregoing description is in all aspects illustrative and not restrictive. It is therefore understood that numerous modifications and variations can be devised without departing from the scope of the invention.

What is claimed is:

1. A projection type display apparatus comprising
a projection lens barrel holding a projection lens,
a micro mirror type display element, and
a main body which holds said micro mirror type display element and on which said projection lens barrel is mounted, wherein
said projection lens barrel is formed with a barrel-side reference surface which becomes a mounting reference in a direction of an optical axis,
said main body is formed with mounting reference surface against which said barrel-side reference surface abuts,
said main body has an adjusting mechanism which absorbs the variation of said length by adjusting a length between a reflection surface of said micro mirror type display element and said mounting reference surface.

2. A projection type display apparatus comprising
a projection lens barrel holding a projection lens,
a micro mirror type display element, and
a main body which holds said micro mirror type display element and on which said projection lens barrel is mounted, wherein
said projection lens barrel is formed with a barrel-side reference surface which becomes a mounting reference in a direction of an optical axis,
said main body is formed with mounting reference surface against which said barrel-side reference surface abuts,
said main body has an adjusting mechanism which adjusts a length between a reflection surface of said micro mirror type display element and said mounting reference surface
said adjusting mechanism is a spacer disposed between a display element fixing member to which said micro mirror type display element is fixed and a references surface forming member which is formed separately from the display element fixing member and which is formed with said mounting references surface.

3. The projection type display apparatus according to claim 2, wherein
said spacer comprises a plurality of spacers disposed at not less than three location in a plane which is orthogonal to the direction of the optical axis of said projection lens barrel.

4. The projection type display apparatus according to claim 2, wherein
said main body includes a mounting member which is formed with a positioning which projects in the direction of said optical axis of said projection lens barrel toward said reference surface forming member for positioning the spacer, said reference surface forming member being mounted on the mounting member,
said reference surface forming member is made of resin molding,
a portion of said reference surface forming member opposed to said positioning projection is formed with a thinned portion which is recessed in a projecting direction of said position projection.

5. A projection type display apparatus comprising
a projection lens barrel holding a projection lens,
a micro mirror type display element, and
a main body which holds said micro mirror type display element and on which said projection lens barrel is mounted, wherein
said projection lens barrel is formed with a barrel-side reference surface which becomes a mounting reference in a direction of an optical axis,
said main body is formed with mounting reference surface against which said barrel-side reference surface abuts,
said main body has an adjusting mechanism which adjusts a length between a reflection surface of said micro mirror type display element and said mounting reference surface
said main body includes a display element fixing member to which said micro mirror type display element is fixed, and a moving portion which moves relative to the display clement fixing member in a direction perpendicular to said direction of the optical axis of said projections lens barrel.

6. The projection type display apparatus according to claim 5, wherein
said moving portion includes a first moving body and a second moving body which move in directions perpendicular to each other, said first moving body moves relative to the display element fixing member together with said second moving body,
said second moving body moves relative to said first moving body.

* * * * *